United States Patent
Schutten et al.

(10) Patent No.: US 7,023,920 B2
(45) Date of Patent: Apr. 4, 2006

(54) FACILITATING MOTION ESTIMATION

(75) Inventors: Robert Jan Schutten, Campbell, CA (US); Abraham Karel Riemens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 765 days.

(21) Appl. No.: 10/078,953

(22) Filed: Feb. 19, 2002

(65) Prior Publication Data
US 2002/0126760 A1 Sep. 12, 2002

(30) Foreign Application Priority Data
Feb. 21, 2001 (EP) ............................................. 01200623

(51) Int. Cl.
*H04N 7/12* (2006.01)

(52) U.S. Cl. .................... 375/240.16; 382/107; 348/699
(58) Field of Classification Search ............ 375/240.16, 375/240.14, 240.15; 348/699, 452, 429.1; 382/107, 236
See application file for complete search history.

(56) References Cited

U.S. PATENT DOCUMENTS

| | | | | |
|---|---|---|---|---|
| 4,890,160 A | * | 12/1989 | Thomas .................... | 348/429.1 |
| 5,329,317 A | | 7/1994 | Naimpally et al. ......... | 348/620 |
| 5,412,435 A | | 5/1995 | Nakajim ..................... | 348/699 |
| 5,581,308 A | * | 12/1996 | Lee ............................. | 348/699 |
| 5,682,205 A | | 10/1997 | Sezan et al. ................ | 348/452 |
| 5,687,097 A | | 11/1997 | Mizusawa et al. .......... | 364/514 |
| 5,786,860 A | * | 7/1998 | Kim et al. ............. | 375/240.15 |
| 6,011,596 A | | 1/2000 | Burl et al. ................... | 348/699 |
| 6,081,606 A | * | 6/2000 | Hansen et al. ............. | 382/107 |
| 6,219,436 B1 | * | 4/2001 | De Haan et al. ........... | 382/107 |
| 6,240,211 B1 | * | 5/2001 | Mancuso et al. ........... | 382/236 |

\* cited by examiner

*Primary Examiner*—Gims Philippe
(74) *Attorney, Agent, or Firm*—Edward W. Goodman

(57) ABSTRACT

An apparatus and method for facilitating a subsequent choice of a motion vector from a plurality of candidate motion vectors in a motion estimation method, include receiving video image data from first, second and third consecutive groups (10, 20, 30) of image data. A first image part (12) of the first group of image data (10), a second image part (22) of the second group of image data (20), and a third image part (32) of the third group of image data (30) are identified, wherein the positions of the three image parts (12, 22, 32) correspond to a motion trajectory that is indicated by a candidate motion vector. A first error measure is then calculated by testing for differences between the first image part (12) and the third image part (32) and quantified as a first error measure. A second error measure is calculated by testing for differences between either the first image part (12) and the second image part (22) or the second image part and the third image part and quantified as a second error measure. An output error measure is then quantified, wherein the output error measure is derived from either the first or the second or a combination of both error measures.

8 Claims, 3 Drawing Sheets

FACILITATING MOTION ESTIMATION

BACKGROUND OF THE INVENTION

1. Field of the Invention

The invention relates to an apparatus and method for facilitating motion estimation on video signals. Such a method finds particular, but not exclusive, application in the field of motion compensated video format conversion (known as MC-VFC) and to 3-D recursive block matching techniques.

2. Description of the Related Art

Motion estimation generally comprises the following steps: 1) acquiring a number of candidate motion vectors; 2) calculating an error measure for each of these candidate motion vectors; and 3) selecting the best vector. This process is applied to all parts of the image. As this is generally a very computationally intensive task, many methods and strategies have been proposed to limit the number of candidates, while preserving a high accuracy and reliability of the calculated motion vectors.

A particularly effective searching arrangement suitable for MC-VFC is utilized in the 3-D Recursive Search Block matcher (3D-RS) described by G. de Haan et al. in "True motion estimation with 3-D recursive block-matching", IEEE Trans. CSVT, October '93 pp. 368–388.

Motion estimation for scan rate conversion in a film mode comprises comparing image blocks of two frames (typically a previous frame and a current frame) to detect areas of similarity between the two successive frames, and where a high degree of similarity exists, the difference in the positions of the similar areas represents the motion vector. In video format conversion, the image data is then shifted over a part of the motion vectors to construct a frame of new (and previously non-existing) data which is temporally located between the two originally successive frames.

With video signals, a slightly more complex problem arises when such a format conversion is required, since video is usually broadcast in an interlaced format (one frame=2 fields, one field containing the odd lines and the next field containing the even lines of the frame). Here, the video sequence contains successive fields that contain vertically partitioned odd lines or even lines of a frame. Such an interlaced format may hamper the detection of similarity between image parts, as half of the lines are "missing". This is particularly true for areas where there is "no motion", as two successive fields (i.e., one with odd lines and one with even lines) cannot be directly compared with each other since they originate from different vertical positions in the image.

One partial solution to the above problem may be given by applying a de-interlacing algorithm. In such an algorithm, a received field may be electronically processed (for instance, by interpolation) so as to build a frame containing both odd and even lines, and the subsequently received field may then be compared to the corresponding lines in such a built-up frame. However, it will be appreciated that because such corresponding lines are the result of a calculation rather than naturally occurring, errors in the de-interlacing algorithm influence the quality of any "no motion" detection in the motion estimator.

U.S. Pat. No. 5,682,205 (Eastman Kodak Company) discloses a process and apparatus for generating a de-interlaced output image from a plurality of sequential interlaced image fields. According to this patent, fields of the same polarity (i.e., even/even or odd/odd) are always compared with one another to estimate motion. One consequence of this is that there is a relatively large "temporal distance" as compared field are always non-consecutive.

U.S. Pat. No. 5,329,317 (Matsushita Electric Corporation of America) discloses an adaptive field/frame filter for interlaced video signals. In this disclosure, where there is a stationary image, frame filtering is preferentially applied, whereas for moving images or parts of images, field filtering is preferred. In this way, both field and frame filtering is done and the results are merged depending on the output of a motion detector. The motion detector always operates on a two-frame basis.

SUMMARY OF THE INVENTION

It is an object of preferred embodiments of the present invention to provide a method by which a frame-based motion estimator, as used in a film mode estimation, may be adapted for use in video mode estimation in a relatively economical fashion. It is another aim to provide a means and method for facilitating a subsequent choice of motion vectors which avoids or overcomes, to an extent, at least some of the problems of the prior art.

Here, the first group of image data may be a first field of an interlaced signal, the second group being a second field, and the third group being a third field. As in preferred embodiments, this is an interlaced type signal, the first and third fields (and second and fourth fields, etc.) will be of the same parity (i.e., both represent odd lines or both represent even lines of a picture).

In a preferred embodiment of the present invention, one of the candidate motion vectors will be the zero vector. The zero vector is the vector which directly maps one image part in one frame to the same image part (i.e., same position) in another frame. The zero vector is a very important vector, since it represents "no motion", which occurs very often in natural video sequences. If the image data of these image parts is identical, then there is a "no motion" condition for that image part and the first error measure for that zero vector will, in preferred embodiments, be zero. If, however, the image data of those image parts is not identical, then there will be a quantifiable non-zero first error measure.

By comparing first and third groups of image data in accordance with the present invention, the zero vector in an interlaced signal is always tested between fields of the same parity. As a result of this, the error measure that is calculated using the first and third groups of image data is significantly more reliable than the error measure calculated using non-like parity fields of two consecutive groups, such as, by using the first and second groups or second and third groups of image data. Therefore, in a preferred embodiment of the present invention, the output error measure will primarily, or only, be constructed from the error measure from the first and third groups of image data. For non-zero candidate motion vectors, however, the error measure that is calculated using the first and second groups or second and third groups of image data is more reliable than the error measure using the first and third groups of image data. As a result of this, the output error measure will be constructed primarily, or only, from the error measure from either the first and second groups or second and third groups of image data.

The best candidate motion vector for a given image part may be a candidate motion vector associated with the lowest of the output error measures.

The calculation of the output error measure from the first and second error measures may be based on the vector length of the associated candidate motion vector. Preferably, where the candidate motion vector length is zero, the first error measure is used as output error measure. Preferably, the first error measure is used whenever the vertical motion vector component is even. Preferably, where the candidate motion vector length is above a maximum Vmax, the second error measure is used as output error measure. Preferably, where the candidate motion vector length is between zero and Vmax, both the first and the second error measure are used to calculate a combined output error measure.

Preferably, the combined error measure is the result of a fade-over between the first error measure and the second error measure of the associated candidate motion vector.

An error measure may be calculated for a candidate motion vector by comparing a part of one image with a part of another image and performing a summed absolute differences calculation.

The first group of image data may comprise a single field only (i.e., a first or a second field, containing only the odd or only the even video lines), or it may comprise a complete frame, consisting of both fields. In case the video sequence originated from film material, two successive fields may originate from one temporal position. In such a case, the first group of image data may be a frame that is simply constructed by combining two successive fields. Alternatively, the frame may be constructed by a more advanced de-interlace calculation, for which many algorithms exist. In case the first group of image data is a complete frame, the vertical resolution of the image is increased, compared to a single field. As a result, one may expect that the error measure will be a more accurate representation of the similarity of the involved image parts, and thus, the quality of the results of the motion estimator will be increased.

As will be appreciated from the above, in order to implement the method and thereby facilitate motion compensation, the method of the present invention requires storage for only three fields of data. In case the first group of image data is a frame, a total of one frame and two fields is required.

The invention also extends to video processing apparatus incorporating video motion estimation utilizing a motion estimation method in which candidate motion vector selection is facilitated by the method of the invention.

BRIEF DESCRIPTION OF THE DRAWINGS

For a better understanding of the invention, and to show how embodiments of the same may be carried into effect, reference will now be made, by way of example, to the accompanying diagrammatic drawings, in which.

DESCRIPTION OF THE PREFERRED EMBODIMENTS

Figure 1:
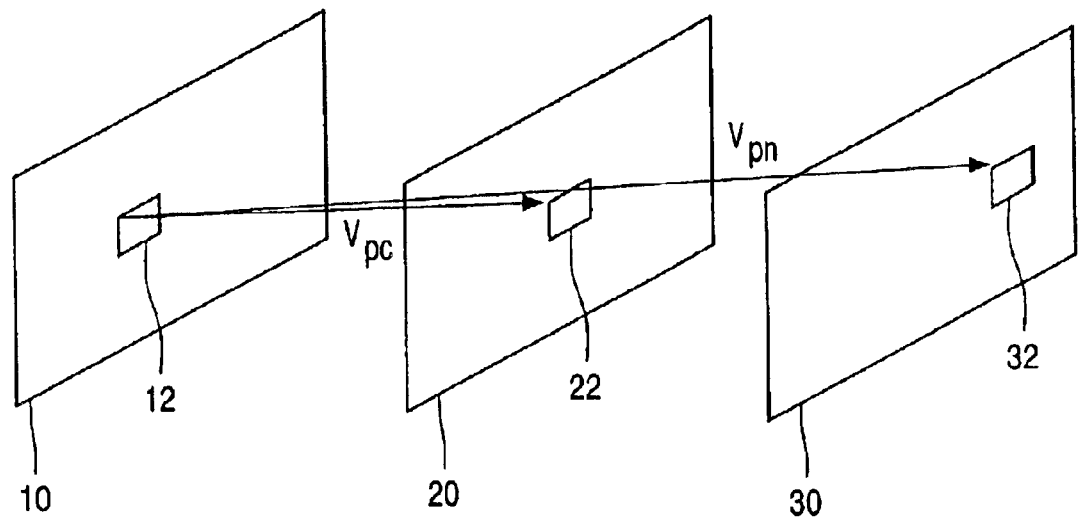
FIG. 1 shows, schematically, three groups of image data and a candidate motion vector linking the three groups.

FIG. 1 shows a first group of image data comprising a first field 10, a second group of image data comprising a second field 20, and a third group of image data comprising a third field 30.

The first, second and third fields may, for instance, be previous (N-2), current (N-1), and next (N) fields, representing consecutive fields of an interlaced video signal. The first field 10 and third field 30 will have the same parity (i.e., they will either both represent even lines of a frame or odd lines of a frame), whereas the second field 20 will be of different parity to the first field 10 and third field 30.

In FIG. 1, there is illustrated a first image part 12 of the first field 10. There is also shown a second image part 22 of the second field 20, and third image part 32 of the third field 30.

In accordance with embodiments of the present invention, an image part of the first field 10 is compared with an image part in the third field 30 to calculate a first error measure and the same or nearly the same image part of the first field 10 is also compared with an image part of the second field 20 to calculate a second error measure.

It will be appreciated that the second error measure may be taken from any pair of consecutive image groups, so, in this case, the second error measure could equally be calculated by comparing the second image part 22 of the second field 20 with the third image part 32 of the third field 30. Hereinafter, however, the specific example described assumes that the second error measure is derived from the comparison between first and second image parts 12, 22.

In FIG. 1, a nominal motion vector between the first image part and the second image part is represented by arrow Vpc, and an extended motion vector between the first image part and the third image part is represented by arrow Vpn. Both the nominal and the extended motion vector represent the same or nearly the same object velocity. Here, an image part may be understood to be, for instance, an area of an image representing image data, such as, a group of pixels (for instance a block or a line). An error measure may be evaluated by using a summed absolute differences (SAD) algorithm. Such an algorithm is well known in the art and the details for calculating this measure need not be gone into here.

In FIG. 1, only a single candidate motion vector is shown, for only a single part of the image where a motion vector needs to be calculated. In a preferred embodiment, it is common to perform similar calculations for a set of candidate motion vectors, followed by a selection of the best motion vector for that particular part of the image. Also, this process is generally repeated for all parts of the image, which results in a known motion vector at every location in the image.

Generally, one of the candidate motion vectors will be the zero vector. In that case, the image parts 12 and 32 are at the same location in the image and they have the same field parity. As a result, the comparison between these two image parts will be a reliable measure of the similarity of the image contents. Thus, that comparison will be used as an output error measure (to be described later). For candidate motion vectors other than the zero vector, the comparison between image parts 12 and 22 will be used to calculate the similarity between the image parts, and thus, that comparison will be used to evaluate an output error measure.

Figure 2:
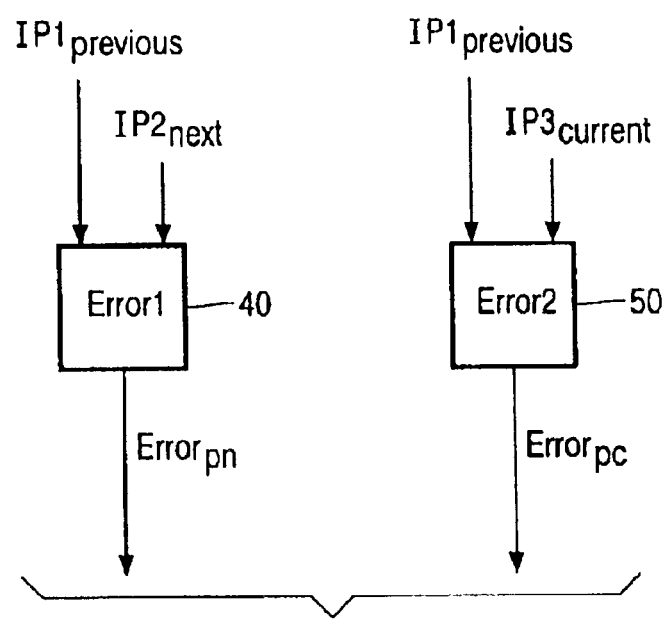
FIG. 2 shows, schematically, the performance of error calculations in accordance with an embodiment of the invention.

Referring now to FIG. 2, there is shown, schematically, a method of evaluating a first error measure in a first error block Error1 40, and a second error measure in a second error block Error2 50 for a given extended candidate motion vector and nominal candidate motion vector, respectively.

In a first error block Error1 40, which may perform a first sum of absolute differences calculation, an error between image data $IP1_{previous}$ of an image part 12 of the first field 10 and image data $IP2_{next}$ of the third image part 32 of the third field 30 is calculated to form the first error measure $Error_{pn}$. An error between the image data $IP1_{previous}$ of the first image part 12 of the first field 10 and image data $IP3_{current}$ of an image part 22 of the second field 20 is calculated in a second error block Error2 50, e.g., a second sum of absolute differences block, to form the second error measure $Error_{pc}$.

It will be appreciated that in order to find the best candidate motion vector for a particular part of the first field 10, a plurality of Error1 units (or calculations) will be required, as many being provided as candidate motion vectors are being tested. Similarly, there may be a plurality of Error2 units (or calculations). In actuality, the plurality of units 40, 50 may amount to one or more units being utilized in a time-multiplexed fashion.

Figure 3:
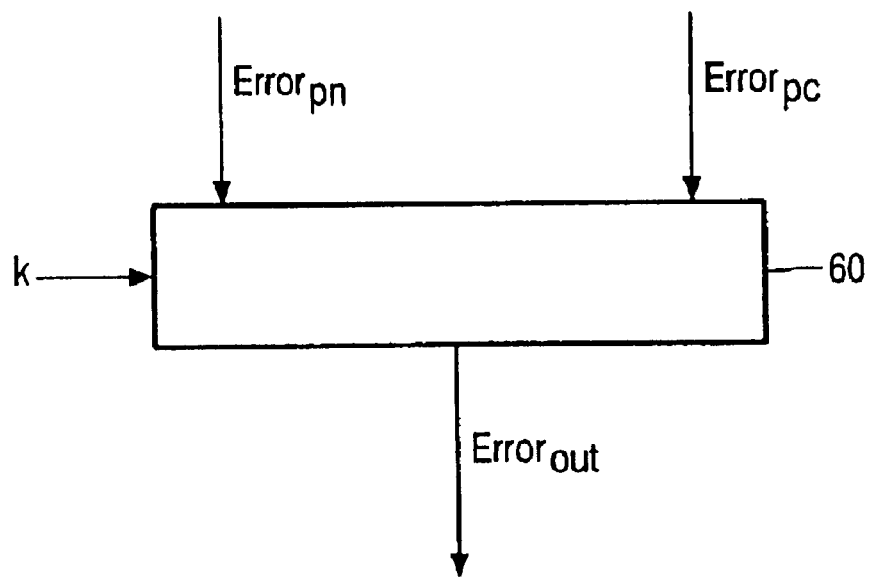
FIG. 3 shows, schematically, a fader unit for the processing of error data.

FIG. 3 shows an adaptive fader unit 60 that receives the first error measure $Error_{pn}$ and the second error measure $Error_{pc}$. In the adaptive fader unit 60, an output error measure $Error_{out}$ is selected to be either $Error_{pn}$, $Error_{pc}$ or a synthesized mix intermediate $Error_{pn}/Error_{pc}$ according to the value of a control input k.

Figure 4:
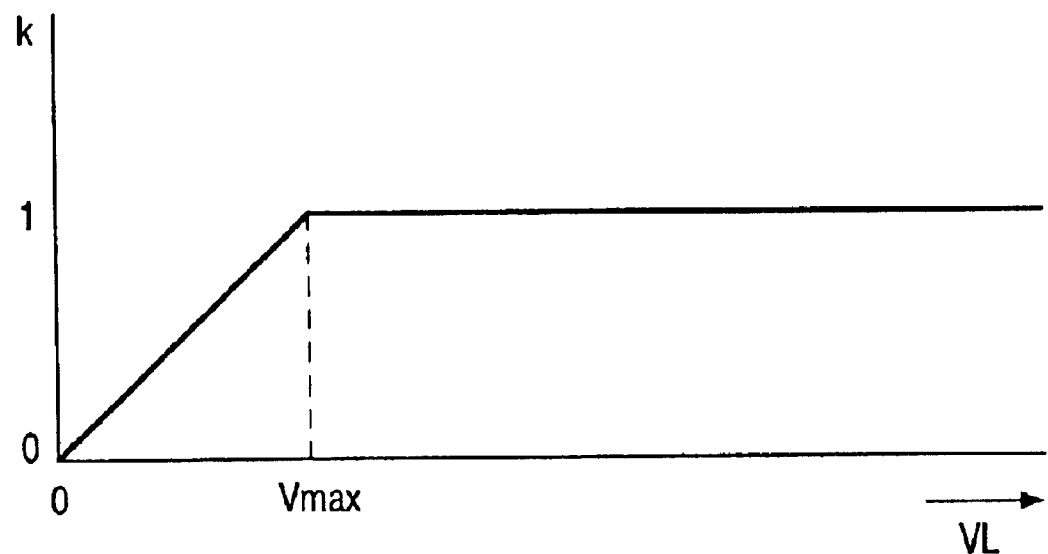
FIG. 4 shows a fade-over algorithm for use in controlling the fader unit of FIG. 3.

FIG. 4 shows how a mixing value k may be decided upon. In FIG. 4, k is shown as being a function of vector length VL having a linear progression from zero to 1 over a given vector length (Vmax) of a candidate motion vector. Specifically, where the candidate motion vector length is zero, k is zero, and where the vector length is a value Vmax or greater then k is 1. For candidate motion vector lengths intermediate 0 and Vmax, k is interpolated linearly. For instance, if Vmax=1, then for a vector length of 0.75, k=0.75.

A simple mixing algorithm based on the shown progression of k may be given by: $Error_{out}=k*Error_{pc}+(1-k)*Error_{pn}$.

A more general equation for combining the first and second error measures may be derived. For instance, assuming the candidate motion vector length is L, a function f(L) may be defined which is zero when L=0 and will rise from 0 to 1 when the input is between 0 and Vmax. With such a notional function, therefore, the output error measure $Error_{out}$ to be supplied to the motion estimator may be given as: $Error_{out}=f(L)*Error_{pc}+(1-f(L))*Error_{pn}$.

From the above, it may be seen that by operation of the fader unit 60, an output error measure $Error_{out}$ may be $Error_{pc}$, $Error_{pn}$ or an intermediate value being the result of a fade-over.

It will be appreciated that some savings in the calculation may be achieved. In those cases that the fader only uses $Error_{pc}$, the value of $Error_{pn}$ does not need to be calculated. Similarly, in those cases that the fader unit only uses $Error_{pn}$, the value of $Error_{pc}$ does not need to be calculated. In those cases that an error measure is not required, also the image data, from which the error measure is derived, is not required. This may save some system resources, such as, calculation time, power or memory accesses (i.e., memory bandwidth).

In the case where the video sequence originates from film material, two successive fields may originate from one temporal position. In such cases, both the second and the third images may originate from one single original frame. As a consequence, the candidate motion vector does not need to be extended, and both the nominal and extended motion vectors will be equal. A frame based error measure may be obtained by still performing the calculation of both $Error_{pn}$ and $Error_{pc}$. When the k value of the fader 60 is forced at 0.5 (independent of the candidate motion vector length), these two error measures are averaged to calculate the value $Error_{out}$. This way, the same system (with only minor adaptations in the control of the various blocks) has calculated a full frame error measure, thus improving the quality of the output error measure.

It will further be appreciated that a preferred embodiment of the method of the present invention can also be used without activating the third image. Obviously, value $Error_{pn}$ cannot be calculated in this case, so the control parameter k of the fader unit needs to be forced at a value of 1. As a result, some system resources, like memory, bandwidth and power, can be saved at the expense of a reduction of the quality of the motion estimator.

Figure 5:
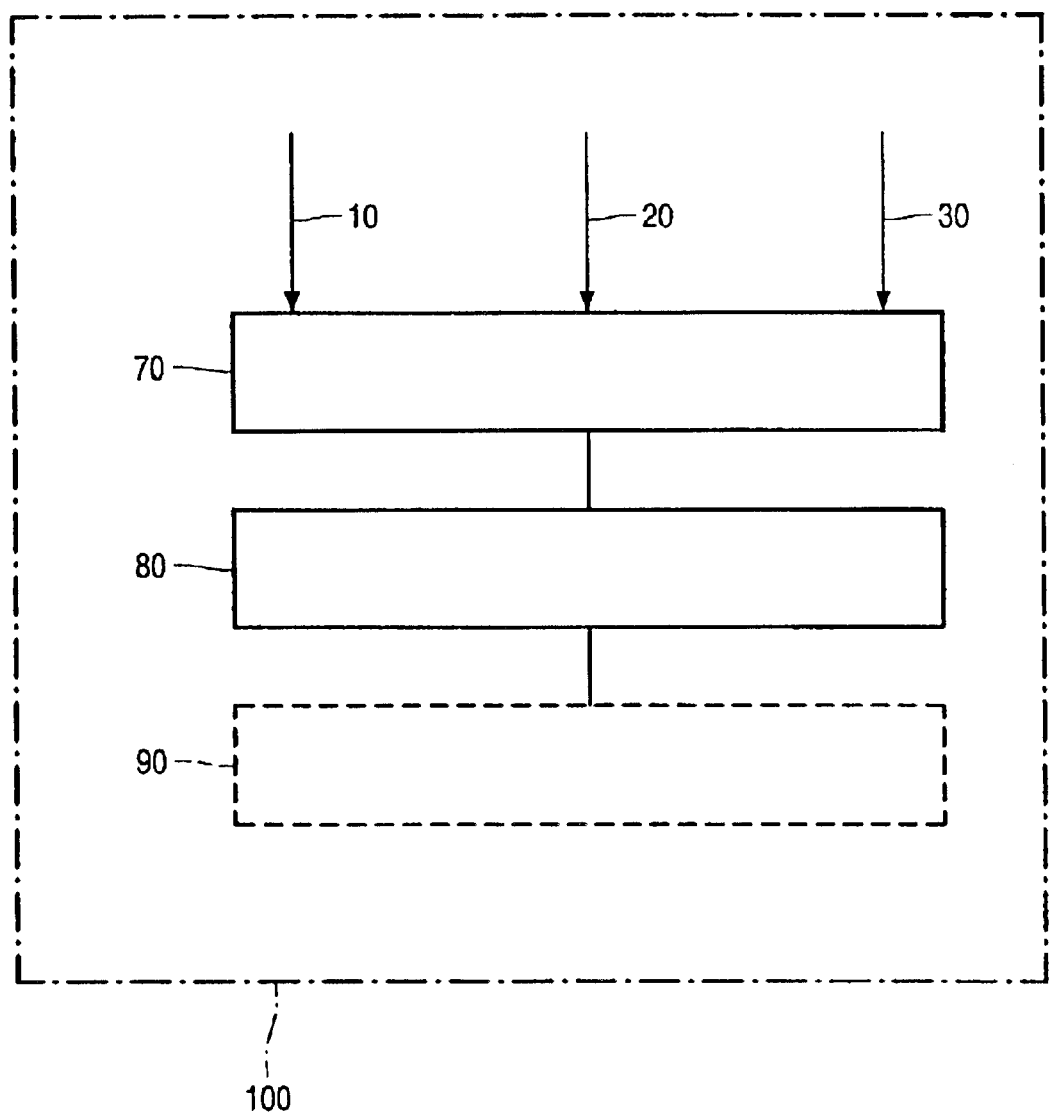
FIG. 5 is a schematic block diagram showing an apparatus for implementing the method of the present invention.

Referring to FIG. 5, there is shown, schematically, an apparatus for providing indications concerning the suitability of candidate motion vectors to a motion estimation apparatus. The apparatus comprises storage means 70 for receiving and storing image data from the three consecutive groups of image data, and processing means 80 for calculating error measures for candidate motion vectors which are passed to a vector selection part of a motion estimation apparatus 90, each of these components forming part of a larger video processing apparatus 100, such as, a television set, VCR, etc. The processing means behaves according the above described methods as illustrated by the FIGS. 1, 2, 3 and 4.

In the above, a method has been described in respect of generating an output error measure indicative of the suitability of candidate motion vectors in a motion estimator. The method is, of course, applied in the same manner to all candidate motion vectors and to all image parts of the image, so as to provide output error measures and motion vectors for the complete image.

It will be understood that the method described in the present invention is unrelated to the number of candidate motion vectors, nor the source of the candidate motion vectors, nor any potential limitation on the length of the candidate motion vectors, nor any other property of the set of candidate motion vectors, nor any other property of individual candidate motion vectors themselves.

It will also be understood that the error measure calculated in the method described in the present invention may not be the only selection criterion for a motion estimator.

It will be appreciated that as the error measures indicate how close a match there is between image data in image parts of the first/third and first/second groups of image data, these error measures may be provided in whatever format is required by an overall motion estimation method, as they thereby facilitate the selection of an appropriate data substitution to be made in a frame to be constructed. With this in mind, the method of the present invention may be applied to many types of motion estimation systems and methods.

It will also be understood that some motion estimation methods incorporating the teachings of the present invention may not require the provision of error measures other than the first and second error measures, and that, therefore, the fade-over algorithm and method may be optional. Alternatively, it may be a switch between the first and second error measures.

The above description describes how three consecutive groups of image data may be utilized as part of a motion estimation system and method. The apparatus and method provides an enhanced system in which the zero or small candidate vectors are treated differently compared to large vectors, such that for small vectors, a larger temporal distance between the images is used than for large vectors.

Because, in preferred embodiments, only 3 fields of image data are required, the method is readily implementable in existing apparatus for scan-rate conversion which typically provide storage for 2 frames of data. In other preferred embodiments, the first group of image data may be a frame and the other two groups of image data may be two fields. In such case, a total of 4 fields of image data are required. In case the method is applied in film mode, these 4 fields may comprise two original film frames.

In the method, a simple test for applicability of the zero vector can be made—even in the case of interlaced fields. In one specific embodiment, the method requires only the testing of the zero vector for groups of image data (fields) of the same parity, while other tests are made between adjacent non-like parity groups.

It will also be appreciated that wherever hardware features are discussed, these may be replaced by software equivalents and vice versa.

The invention is not limited to the embodiments discussed herein, but only by the appended claims. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A method for facilitating a choice of a motion vector from a plurality of candidate motion vectors in a motion estimation method, the method comprising the steps:

receiving video image data from first, second and third consecutive groups of image data;

identifying a first image part of the first group of image data, a second image part of the second group of image data, and a third image part of the third group of image data, wherein the positions of the three image parts correspond to a motion trajectory indicated by a candidate motion vector;

calculating a first error measure by testing for differences between the first image part and the third image part, and quantifying the differences as the first error measure;

calculating a second error measure by testing for differences between either the first image part and the second image part, or the second image part and the third image part, and quantifying the differences as the second error measure; and outputting an output error measure, wherein the output error measure is derived from the first error measure and/or the second error measure in dependence on a vector length of the candidate motion vector.

2. The method as claimed in claim 1, wherein when a candidate motion vector length is above a maximum length Vmax, then the second error measure is selected as the output error measure.

3. The method as claimed in claim 2, wherein, for candidate motion vectors having a vector length greater than Vmax, the third image part is not used, whereby the output error measure only comprises the second error measure and the corresponding first error measure need not be calculated.

4. The method as claimed in claim 1, wherein where the vector length of the candidate motion vector is between zero and a maximum length Vmax, the output error measure is a value based on a combination of the first error measure and the second error measure.

5. The method as claimed in claim 4, wherein the output error measure is given by the equation $Error_{out}=f(L)*Error_{pc}+(1-f(L))*Error_{pn}$, wherein $Error_{out}$ is the output error measure; $Error_{pc}$ is the second error measure; $Error_{pn}$ is the first error measure; and $f(L)$ is a function of the vector length of the candidate motion vector, $f(L)$ being one when the vector length is greater than or equal to Vmax, and being zero when the vector length is zero.

6. The method as claimed in claim 1, wherein the output error measure is calculated by taking a weighted sum of the first and the second error measures.

7. An apparatus for facilitating a choice of a motion vector from a plurality of candidate motion vectors in a motion estimation device, the apparatus comprising:

storage means for receiving and storing video image data from first, second and third consecutive groups of image data; and processing means for identifying a first image part of the first group of image data, a second image part of the second group of image data, and a third image part of the third group of image data, wherein the positions of the three image parts correspond to a motion trajectory indicated by a candidate motion vector; said processing means calculating a first error measure by testing for differences between the first image part and the third image part, and quantifying the differences as the first error measure; calculating a second error measure by testing for differences between either the first image part and the second image part, or the second image part and the third image part, and quantifying the differences as the second error measure; and outputting an output error measure, wherein the output error measure is derived from the first error measure and/or the second error measure in dependence on a vector length of the candidate motion vector.

8. A video processing apparatus incorporating video motion estimation utilizing a motion estimation method in which candidate motion vector selection is facilitated by the method as claimed in claim 1.

* * * * *